March 5, 1957 — A. A. HEYMAN — 2,784,097
EDIBLE CONTAINERS FOR MULTIPLE SCOOPS OF ICE CREAM
Filed Aug. 29, 1955 — 2 Sheets-Sheet 1

INVENTOR
Albert A. Heyman.
BY Albert J. Kramer
ATTORNEY

March 5, 1957  A. A. HEYMAN  2,784,097
EDIBLE CONTAINERS FOR MULTIPLE SCOOPS OF ICE CREAM
Filed Aug. 29, 1955  2 Sheets-Sheet 2
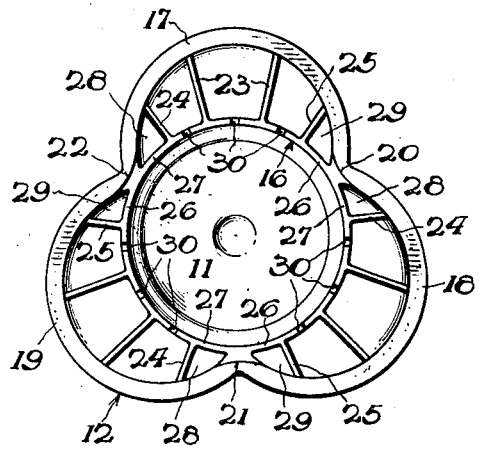
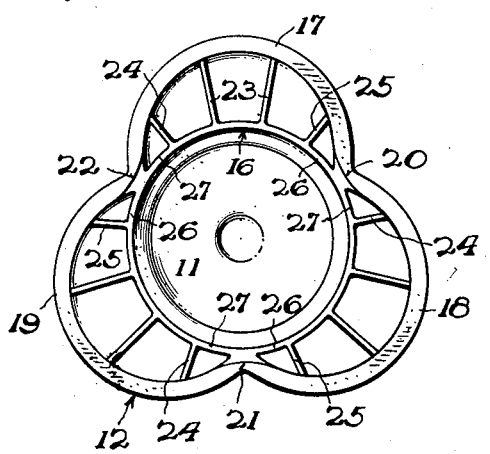
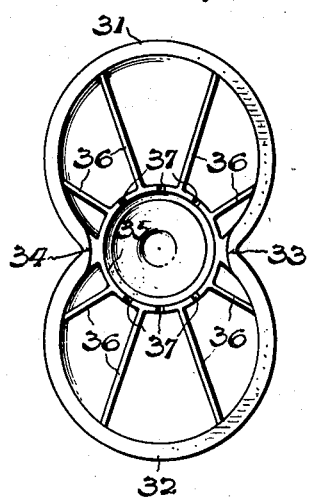
INVENTOR
Albert A. Heyman.
BY Albert J. Kramer
ATTORNEY

United States Patent Office 2,784,097
Patented Mar. 5, 1957

2,784,097

EDIBLE CONTAINERS FOR MULTIPLE SCOOPS OF ICE CREAM

Albert A. Heyman, Baltimore, Md., assignor to The Maryland Baking Company, Baltimore, Md., a corporation of Maryland Application August 29, 1955, Serial No. 531,001

7 Claims. (Cl. 99—89)

This invention relates to edible containers and is more particularly concerned with edible containers for ice cream which are adapted to hold two or more scoops of ice cream in side by side relation.

One of the objects of this invention is the provision of such a container which has a high factor of resistance to breakage during the customary handling thereof between the time they are manufactured and the time they are used by the ultimate consumer.

Another object of the invention is the provision of a container of the type mentioned which has a firm horizontal support for two or more ice cream scoops or balls placed thereon in side by side relation.

A further object of the invention is the provision of such a cone which is readily adaptable to manufacturing by conventional molding methods and techniques.

These and other objects and advantages of the invention will appear more fully from the following description considered together with the accompanying drawing.

In the drawing:

Fig. 4 is a top plan view of the same embodiment.

Fig. 5 is a top plan view of a modified embodiment.

Fig. 6 is a top plan view of a further embodiment of the invention in the form of a two-lobed ice cream cone.

Figure 1:
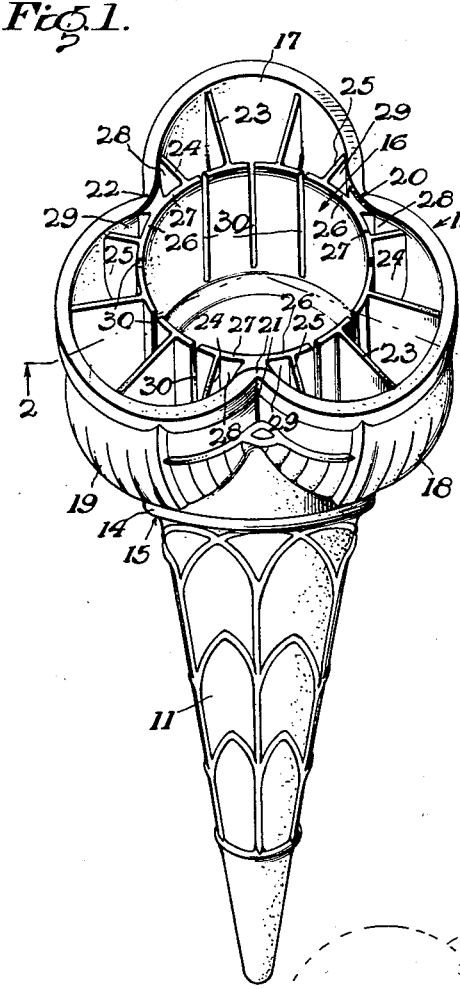
Fig. 1 is a perspective view of an embodiment of the invention in the form of a three-lobed ice cream cone.
Figure 3:
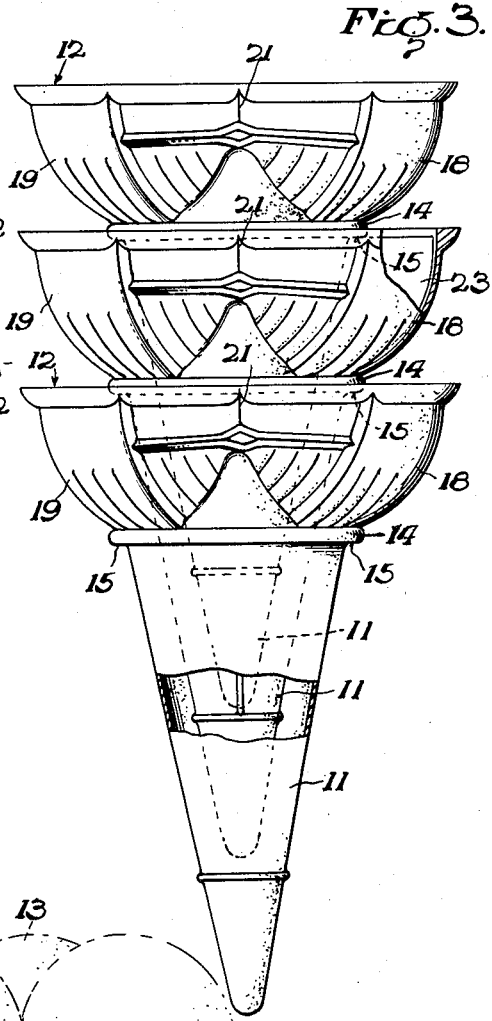
Fig. 3 is a side elevational view of a group of three cones of the same embodiment in nested relation.
Figure 2:
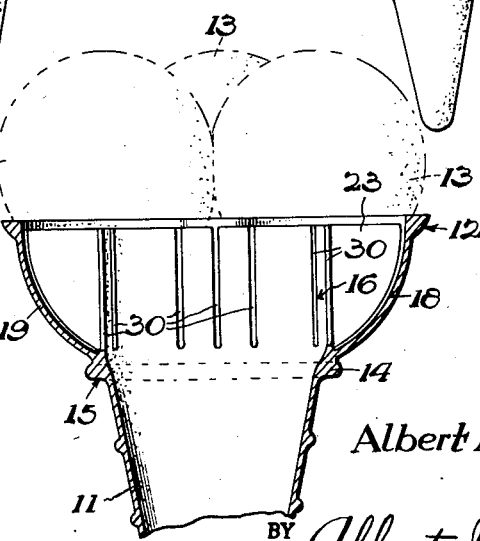
Fig. 2 is an elevational sectional view of the same embodiment, partly broken away, along the line 2—2 of Fig. 1, showing in dotted lines the relative positions of three scoops of ice cream thereon.

Referring with more particularity to the drawing, in which like numerals designate like parts throughout the several views, the embodiment of Figs. 1 to 4 comprises a bottom section 11 which may be in the customary conical form, as shown, or frustro-conical (not shown) or of any other desired shape. This section is surmounted by upper section 12 which initially supports the usual ice cream scoops or hemispherical balls 13.

Between the upper section 12 and lower section 11 there is formed a nesting ring 14 which has a downwardly facing annular shoulder 15 for engagement with the upper end of a central cylindrical member 16 on the inside of the section 12.

The cylindrical member 16 is an integral upward extension of the upper edge of the interior wall of the section 11. Surrounding the member 16 are a series of outwardly flaring curved lobes 17, 18 and 19, each in the general shape of a quarter-sphere. These lobes are formed of a continuous wall and are integral with each other and with the cylindrical formation at the ends or nodes 20, 21 and 22. This forms a strong structure because it utilizes the central member as a structural support or reaction member at the three nodes.

In addition to the support at the nodes, further support is provided by radial fins 23 between the lobes and the cylindrical member 16. These fins, as well as the cylindrical member 16, extend upward to the plane or nearly to the plane of the lobes in order to form a horizontal support for the ice cream balls or scoops.

This construction provides an extremely strong structure for the reasons given above and for the further reason that the fins 24 and 25 on the opposite sides of each node, form with the merging walls of the adjacent lobes and with adjacent sections 26 and 27 of the member 16, structural triangles 28 and 29, the presence of which adds considerable strength to the containers and resists crushing and breakage by forces acting in a radial as well as an axial direction.

In the embodiment of Figs. 1 to 4, vertical drainage slots 30 are provided in the cylindrical member 16 between the fins 24 and 25 of adjacent lobes to permit the flow of melted ice cream from the interior of the lobes to the interior of the section 11. These drainage slots, however, may be dispensed with in accordance with the embodiment of Fig. 5, this embodiment being otherwise identical to that of Figs. 1 to 4.

The embodiment in Fig. 6 is the same as that illustrated in Figs. 1 to 4, except that only two lobes 31 and 32 are provided, instead of three. The corresponding nodes 33 and 34 are thus disposed diametrically opposite each other and made integral with the cylindrical member 35, corresponding to member 16 of the previous embodiments. Fins 36 are similarly provided and drainage slots 37 may be provided or omitted, as desired.

Having thus described my invention, I claim:

1. An edible container comprising a lower handle section surmounted by an upper section integral therewith for supporting ice cream, said upper section comprising a central interior arcuate wall portion extending upwardly through the upper section and terminating at the top of said upper section and a plurality of exterior lobes having intersecting ends forming nodes, said nodes being rigidly connected to the central arcuate portion.

2. An edible container comprising a lower handle section surmounted by an upper section integral therewith for supporting ice cream, said upper section comprising a central interior arcuate wall portion extending upwardly through the upper section and terminating at the top of said upper section and a plurality of exterior lobes having intersecting ends forming nodes, said nodes being rigidly connected to the central arcuate portion, said central arcuate portion having drainage slots between said nodes.

3. An edible container comprising a lower handle section surmounted by an upper section integral therewith for supporting ice cream, said upper section comprising a central interior arcuate wall portion extending upwardly through the upper section and terminating at the top of said upper section and a plurality of lobes having intersecting ends forming nodes, said nodes being rigidly connected to the central arcuate portion, and members connecting said lobes and arcuate portion at points between said nodes.

4. An edible container comprising a lower handle section surmounted by an upper section integral therewith for supporting ice cream, said upper section comprising a centrol interior arcuate wall portion extending upwardly through the upper section and terminating at the top of said upper section and a plurality of lobes having intersecting ends forming nodes, said nodes being rigidly connected to the central arcuate portion, and radial fins connecting said lobes and arcuate portion at points between said nodes.

5. An edible container as defined by claim 4 in which the upper edges of the central interior arcuate wall portion, the upper edges of the radial fins and the upper edges of the lobes lie in substantially the same plane to act together as a support for ice cream balls.

6. An edible container comprising a lower handle section surmounted by an upper section integral therewith for supporting ice cream, said upper section comprising a central interior arcuate wall portion extending upwardly through the upper section and terminating at the top of said upper section and a plurality of lobes having intersecting ends forming nodes, said nodes being rigidly connected to the central arcuate portion, said radial fins connecting said lobes and arcuate portion at points between said nodes, said central arcuate portion having drainage slots between at least some of said fins.

7. An edible container comprising a lower handle section surmounted by an upper section integral therewith for supporting ice cream, said upper section comprising a central interior arcuate wall portion extending upwardly through the upper section and terminating at the top of said upper section and a plurality of lobes having intersecting ends forming nodes, said nodes being rigidly connected to the central arcuate portion, and a nesting ring between said sections having a downwardly facing shoulder for engaging a corresponding central interior arcuate wall portion of a like edible container.

References Cited in the file of this patent
UNITED STATES PATENTS

| | | |
|---|---|---|
| D. 89,732 | Balton | May 2, 1933 |
| 1,783,799 | Kohr | Dec. 2, 1930 |
| 1,894,545 | Schoenfeld | Jan. 17, 1933 |
| 2,462,497 | Heyman | Feb. 22, 1949 |